United States Patent [19]

Ware

[11] 4,313,639
[45] Feb. 2, 1982

[54] MOTORCYCLE BACKREST
[75] Inventor: Robert A. Ware, Tulsa, Okla.
[73] Assignee: Ware Manufacturing, Incorporated, Tulsa, Okla.
[21] Appl. No.: 43,110
[22] Filed: May 29, 1979
[51] Int. Cl.³ .......................... A47C 1/025; B62J 1/00
[52] U.S. Cl. .................................. 297/366; 297/195; 297/373; 297/374; 297/DIG. 9
[58] Field of Search ................ 297/DIG. 9, 373, 374, 297/243, 195; 280/289 E; 248/288 R

[56] References Cited
U.S. PATENT DOCUMENTS

| | | | |
|---|---|---|---|
| 899,445 | 9/1908 | Day | 248/288 R |
| 1,449,866 | 3/1923 | MacTyre | 248/288 R |
| 1,796,949 | 3/1931 | Huntley | 297/373 |
| 2,578,879 | 12/1951 | DeYoung | 297/373 |
| 2,660,226 | 11/1953 | Wing | 297/373 |
| 3,362,747 | 1/1968 | Fuelling et al. | 297/373 |
| 3,511,106 | 5/1970 | Deeby | 248/538 X |
| 3,698,762 | 10/1972 | Gorman | 297/DIG. 9 X |
| 3,822,917 | 7/1974 | George | 297/DIG. 9 X |
| 3,850,353 | 11/1974 | Foulds | 297/DIG. 9 X |
| 3,899,209 | 8/1975 | Schultz | 297/DIG. 9 X |
| 3,901,534 | 8/1975 | Popken | 297/DIG. 9 X |
| 4,030,750 | 6/1977 | Abram | 297/DIG. 9 X |
| 4,186,937 | 2/1980 | Schultz | 297/DIG. 9 X |

FOREIGN PATENT DOCUMENTS

| | | | |
|---|---|---|---|
| 14586 | 10/1934 | Australia | 297/373 |
| 907975 | 4/1954 | Fed. Rep. of Germany | 297/373 |
| 993321 | 10/1951 | France | 297/373 |
| 494590 | 5/1954 | Italy | 297/373 |

Primary Examiner—William E. Lyddane
Attorney, Agent, or Firm—James H. Chafin

[57] ABSTRACT

A motorcycle backrest for mounting to the frame of, and working in cooperation with the seat, of a motorcycle. The backrest comprises a pair of elongated frame arm members having bracketry for universal mounting to various makes and models of motorcycles. A backrest pad is secured to the outer ends of a pair of support arms which are in turn pivotally mounted to the frame arm members. The backrest further comprises locking apparatus for locking the support arms in a plurality of different angular positions with respect to the frame arms.

17 Claims, 19 Drawing Figures

MOTORCYCLE BACKREST

BACKGROUND OF THE INVENTION

1. Field of the Invention

The present invention relates to a backrest for vehicles and more particularly, but not by way of limitation, to an adjustable backrest for use in cooperation with the seat of a motorcycle.

2. History of the Prior Art

Motorcycle riding, as a sport and as an economical means of transportation, has been increasing in recent years. This has been brought about by the availability of more leisure time and also by the scarcity and high cost of fuel.

Accompanying this increase in motorcycle riding are apparent increases in physical problems such as lower back strain due to extended trips on motorcycles without adequate back support for the rider. In the past, motorcycle advocates wore rather wide rigidly constructed belts to provide this lower back support. However, the present generation of motorcycle riders wear everything from street clothes to bathing suits to business suits and have rejected the use of such support belts.

Most of the present motorcycle seats are elongated so that a second passenger may be carried behind the operator. Many of these seats are provided with rigidly mounted upwardly extending backrests for the second rider. However, these backrests do not provide the lower back support for the operator when riding alone.

SUMMARY OF THE INVENTION

The present invention provides an adjustable backrest for use primarily on motorcycles or other similar forms of transportation such as bicycles, three-wheel cycles or the like.

The present invention provides a pair of oppositely disposed frame attachment members, one being securable along each side of the motorcycle seat. The forward ends of each of these members are typically attached to the frame at the upper ends of the rear wheel shock support members. A universal bracket member is used to attach the rear portion of the frame attachment arms to the motorcycle frame rearwardly of the said shock supports. Often the rear support mounting requires the relocation of the turn signal lamps. Hence, the aft end of each frame attachment arm is provided with an outwardly extending turn signal mounting stud.

A transversely disposed backrest pad is attached to the outer ends of a pair of oppositely disposed support arms. The inner ends of these support arms are pivotally attached to the frame attachment arm by an angular adjustment and locking mechanism.

The adjustment and locking mechanism takes on several embodiments as hereinafter set forth, but common to these embodiments are a pair of axially aligned pivotal pins for securing the support arms to the frame arms in a pivotal mode of operation.

One embodiment includes a pair of outwardly facing disc members either secured to or made as a part of the frame arms and surrounding the pivot pins. The outer face of the disc members are provided with a plurality of radial serrations.

Likewise, the inner ends of each support arm are provided with a similar set of inwardly facing disc members having a plurality of radially extending serrations which are meshably engageable with those of the frame arm members. Hence, when the cooperating serrated disc members are forced into engagement, the angular position of the support arms are locked with respect to the frame arms. The means to force engagement of the serrations generally comprise locking apparatus connected to the pivot pins and which may be loosened in order to change the angular position of the support arms.

A second embodiment of the locking mechanism taught herein comprises a set of ratchet teeth provided on each support arm and cooperating ratchet pawl members carried by the frame members whereby adjustment of the padded seat member may be made forwardly by a ratcheting action whereas adjustment in a rearward direction requires a manual release of the ratchet pawl.

By various means taught herein the support arms may be pivotally adjusted to anywhere from full forward to provide lower back support for the operator of the cycle to almost fully reclined for carrying luggage or the like. The arms may be supported practically anywhere in between these extreme positions depending on the number of radial serrations or ratchet teeth provided. Hence, the backrest may be set in a position to support the back of a passenger behind the operator or for the upright mounting of a backpack or other luggage thereto.

Naturally, these cooperating radial serrations could be replaced by friction pads which would provide an infinite adjustment range. However, applicant feels that the finite number of serrations or ratchet teeth which can amount to as many as 80 provides an increased safety factor without significantly decreasing the range of adjustment.

An additional safety feature is provided by the aforementioned turn signal studs. These stud members are positioned to contact the pivotal support arms and limit them from being pivoted rearwardly of a desired rearmost position.

DESCRIPTION OF THE DRAWINGS

Other and further advantageous features of the present invention will hereinafter more fully appear in connection with a detailed description of the drawings, in which.

DESCRIPTION OF THE PREFERRED EMBODIMENT

Referring to the drawings in detail, reference character 10 generally indicates an adjustable backrest mechanism for use on and in cooperation with a motorcycle generally indicated by reference character 12 having seat member 14.

Figure 5:
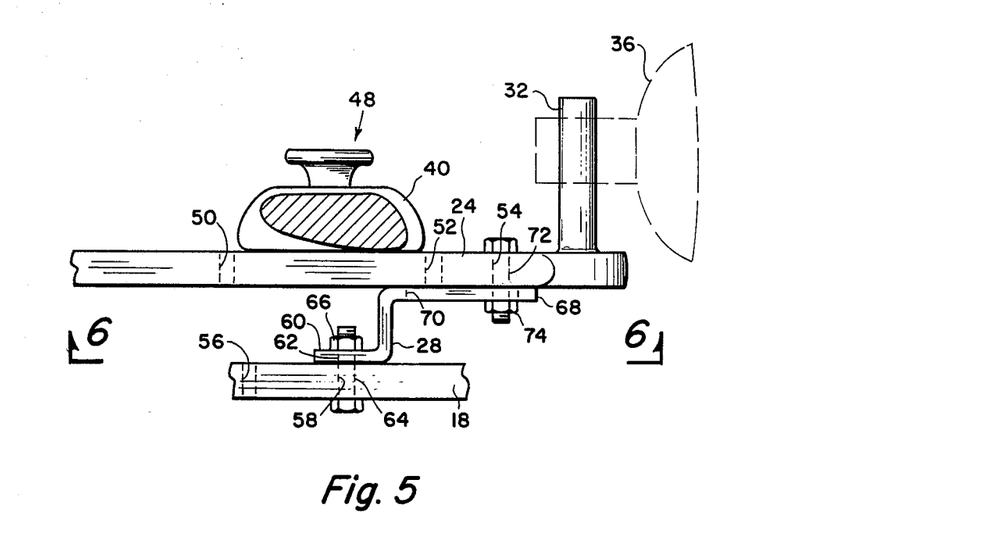
FIG. 5 depicts a plan view of the first embodiment of the universal bracket.

On most motorcycle designs, there are elongated yieldable shock struts 16 and 17 which extend from the rear motorcycle wheel axles (not shown) upwardly to connect to the motorcycle frame 18 by means of suitable mounting bolts 20 and 21. This frame member 18, in addition to supporting motorcycle accessories such as a seat, fenders, gasoline tank and the like, normally extends rearwardly of the shock mounting bolt 20 and is provided with mounting bracketry and the like for supporting motorcycle turn signal lamps and the like as shown in FIG. 5.

The backrest apparatus 10 generally comprises a pair of oppositely disposed elongated frame attachment arms 22 and 24. These frames attachment arms 22 and 24 are longitudinally oriented on each side of the seat 14 and are provided with transverse bores in the forward ends thereof for attachment to the frame 18 by way of the left and right shock strut mounting bolts 20 and 21, respectively.

A pair of universal mounting brackets 26 and 28 are utilized to secure the rear end portions of the frame attachment arms 22 and 24 to the frame 18 in a manner that will be hereinafter set forth.

The rear ends of the frame attachment arms 22 and 24 are provided with a pair of outwardly extending stud members 30 and 32 for the purpose of providing relocation attachment means for a pair of left-right turn signal lamps 34 and 36, respectively. The outwardly extending stud members 30 and 32 will further serve as a safety device as will be hereinafter set forth.

The backrest apparatus 10 further comprises a pair of elongated backrest pad support arms 38 and 40, the first ends of which are connected together by a transverse rod member 42.

A cylindrical shaped cushion member 44 is secured around and to the rod member 42 for supporting the back of the front or back motorcycle rider as will be hereinafter set forth.

Figure 1:
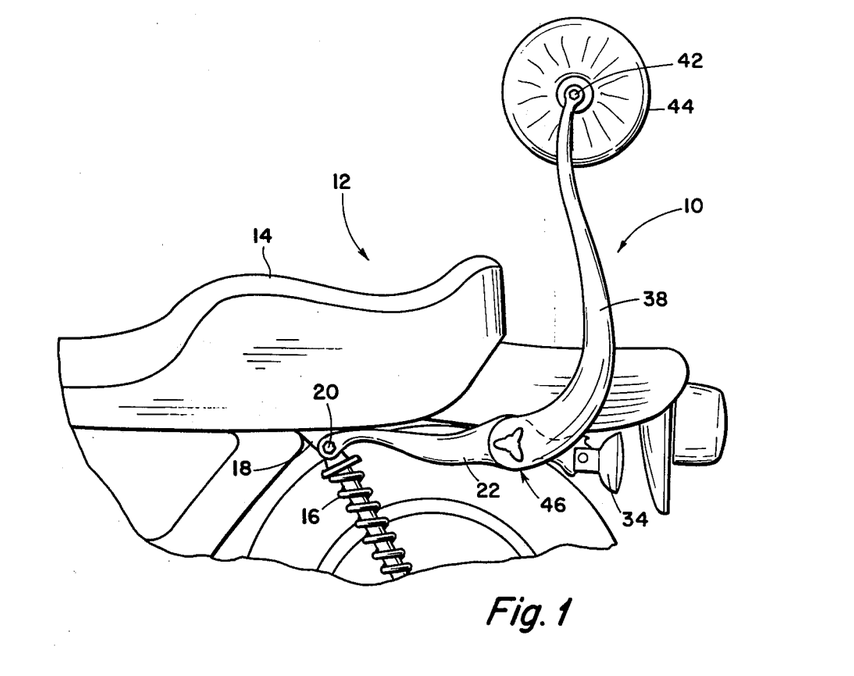
FIG. 1 depicts a side elevational view of a backrest embodying the present invention.
Figure 2:
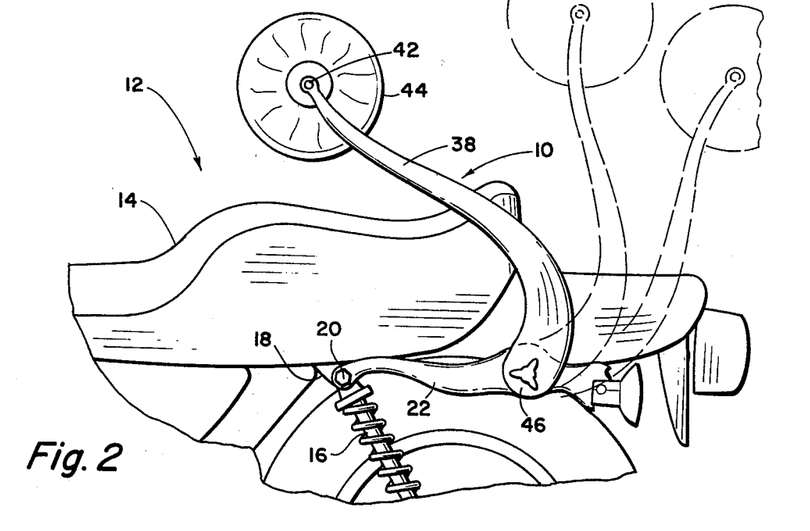
FIG. 2 depicts the backrest of FIG. 1 shown in a second position.
Figure 3:
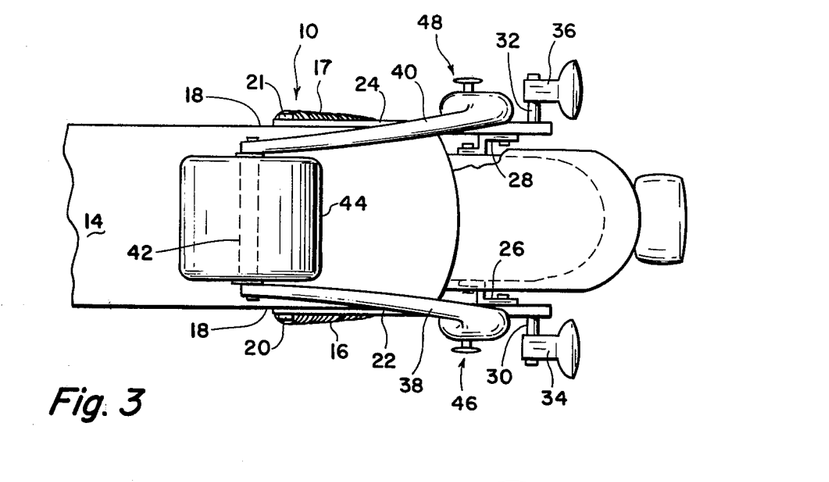
FIG. 3 is a top plan view of the backrest in the position as depicted in FIG. 2.

The second or inner ends of the support arms 38 and 40 are pivotally secured to the frame arms 22 and 24, respectively, by a pivotal attachment and locking apparatus generally indicated by reference characters 46 and 48, respectively. The pivotal attachment and locking mechanisms 46 and 48 may be utilized to angularly adjust the support arms 38 and 40 and thereby adjust the position of the backrest cushion pad 44 in a plurality of positions with respect to the motorcycle seat as shown by the dashed or phantom lines of FIG. 2.

Figure 4:
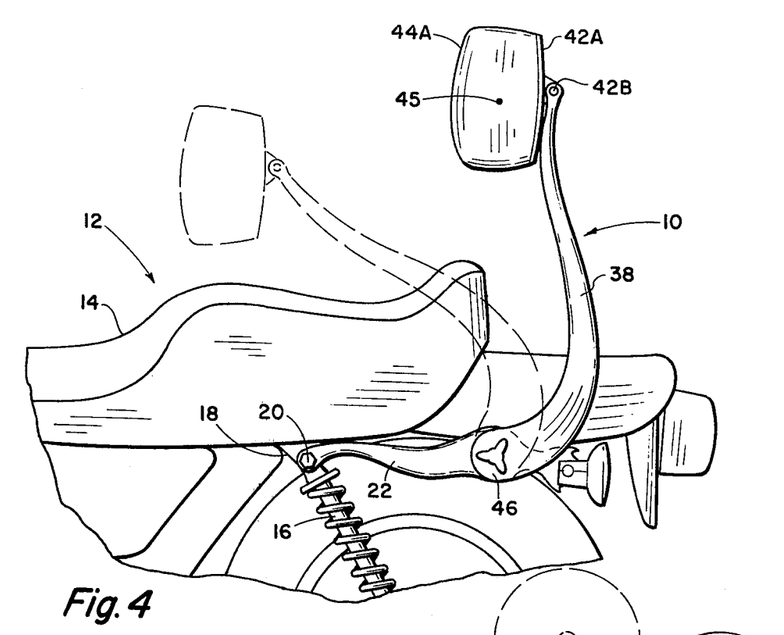
FIG. 4 is a side elevational view of a backrest depicting a second embodiment of a backrest pad.

Referring now to FIG. 4, reference character 42A depicts a rigid backrest cushion plate which is pivotally mounted to the outer ends of the support arms 38 and 40 by a pivot pin or pins 42B. The front face of the cushion plate 42A is provided with an upholster cushion pad 44A, the center of gravity of the combination cushion pad and plate being indicated by reference character 45. It is noted at this point that the center of gravity 45 is located at a lower elevation than the pivot pin 42B when the support arms 38 and 40 are in an upright position or forward of an upright position as shown by the phantom lines.

The orientation of the center of gravity 45 of the cushion with respect to the pivot 42B as hereinbefore described would cause the padded cushion 44A to always face forward when the support arms 38 and 40 are in an upright position or forward of an upright position in order to provide back support for the motorcycle operator (not shown) or a passenger behind the operator (also not shown).

Figure 6:
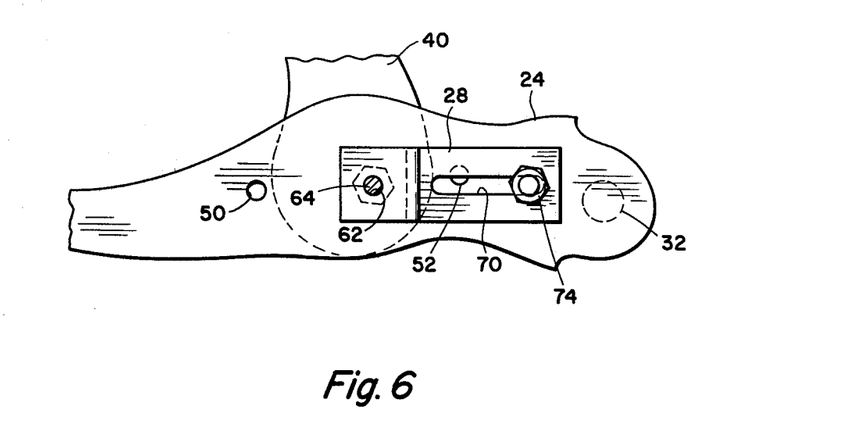
FIG. 6 is a sectional elevational view of the bracket of FIG. 5 taken along the broken lines 6—6 of FIG. 5.

Referring now to FIGS. 5 and 6, it is noted that the right frame attachment arm 24 is provided with a plurality of spaced mounting bores 50, 52 and 54 which are spaced apart in a manner to coincide with the proximity of one or more frame bores 56 and 58 found on most makes and models of motorcycles. The universal attachment bracket 28 comprises an elongated plate member having a forward leaf 60 to the frame member 18 by suitable bolt and nut members 64 and 66. The bracket 28 also comprises a second leaf member 68 which is transversely offset from the leaf member 60 and is provided with an elongated mounting slot 70 therein. The leaf member 68 is then bolted to the frame attachment 24 by means of a suitable bolt and nut assembly 72 and 74.

It is further noted that the connecting bolts 64 and 72 are offset longitudinally. Although the bracket member 28 is made of rather rigid material such as steel, some cushioning effect is provided by the longitudinal offsetting of the bolts 64 and 72 due to the slight yieldability of the bracket material 28.

Figure 7:
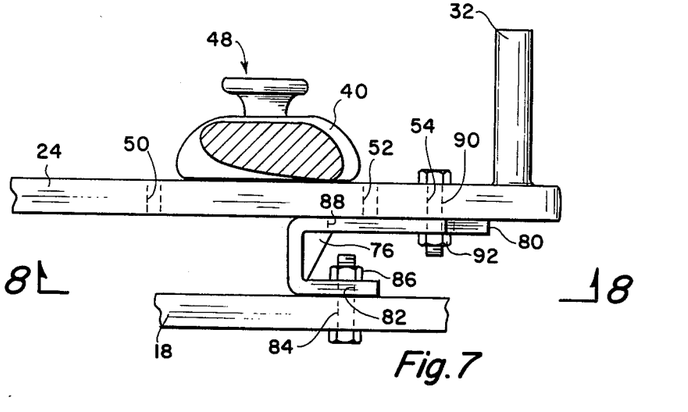
FIG. 7 depicts a plan view of a second embodiment of a universal bracket.
Figure 8:
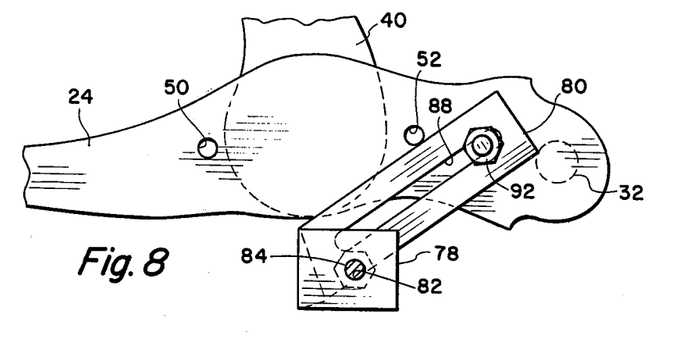
FIG. 8 is an elevational sectional view of a bracket of FIG. 7 taken along the broken lines 8—8 of FIG. 7.

Referring now to FIGS. 7 and 8, reference character 76 depicts a second embodiment of a bracket for securing the frame attachment member 24 to the frame 18 in a similar manner. The bracket 76 has a substantially U-shaped cross section comprising a pair of oppositely disposed leaf members 78 and 80, the leaf member 78 being twisted out of the classical U-shaped cross section as shown in FIGS. 7 and 8. The leaf 78 is provided with a bore 82 for mounting to the frame 18 by means of a bolt and nut 84 and 86. The opposite leaf 80 is provided with an elongated slot 88 to provide for securing the leaf 80 to the frame attachment arm 24 by a suitable bolt and nut assembly 90 and 92.

Again there is an offset longitudinally and/or vertically between the mounting bolts 84 and 90. Although the bracket member 76 is made of a rigid material such as steel, some yieldability or cushioning effect is provided by the offset of the bolts 84 and 90.

Figure 9:
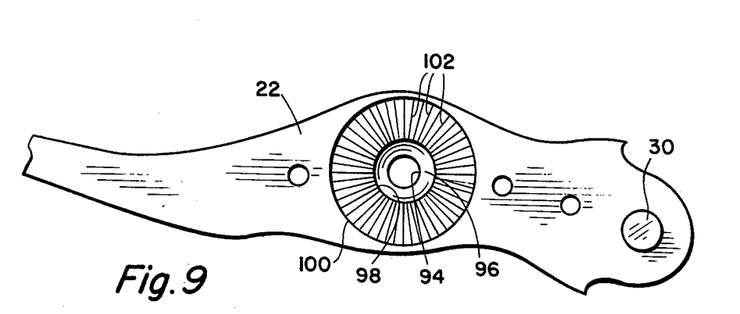
FIG. 9 is a detail of a frame arm of the present invention.
Figures 10, 13, 14, 15:
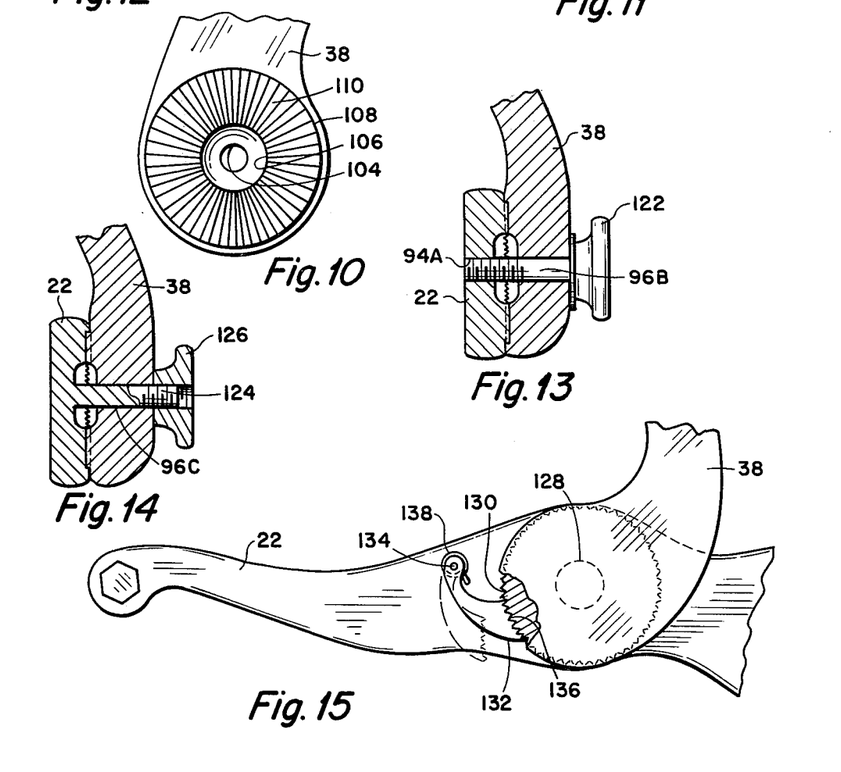
FIG. 10 is an elevational detail of a portion of a support arm of the present invention.
FIG. 13 is an end elevational sectional view of a second embodiment of a locking device.
FIG. 14 is an end elevational sectional view of a third embodiment of a locking device.
FIG. 15 is a side elevational view of a fourth embodiment of the locking device.

Referring now to FIGS. 9 and 10, FIG. 9 depicts a detail of the outside face of the frame attachment arm 22 while FIG. 10 depicts a detail of the inside face of support arm 38. The outside face of the frame arm 22 is provided with a bore 94 and an outwardly extending pivot pin member 96 carried by the bore 94. It is noted at this point that the pivot pin 96 may be made as an integral part of the frame arm 22.

Surrounding the bore 94 is a somewhat hemispherical recess 98. Surrounding the hemispherical recess 98 is a recessed circular disc member 100, the outer face of which is provided with a plurality of radially extending serrations or grooves 102. The disc 100 may comprise a separate disc member secured to the frame attachment arm 22 or may be molded as an integral part thereof. Likewise, it is pointed out that the outside surface of the frame attachment arm 24 is provided with identical bores, hemispherical recesses and serrated disc members as hereinbefore described in connection with the frame support arm 22. The pivot pins 96 for both the frame attachment arms 22 and 24 are mounted on the cycle 12 in axial alignment.

Referring now to FIG. 10, the inner end of the support arm 38 is provided with a transverse bore 104 therethrough. The inside surface of the support arm 38 is provided with a hemispherical like recess 106 which is turn is surrounded by a circular disc member 108. The inner surface of the circular disc member 108 is provided with a plurality of radially extending serrations 110 substantially identical to the serrations 102 in the disc 100.

As will be hereinafter set forth in connection with the descriptions of the various latching embodiments shown in FIGS. 11 through 14, that when the support arm 38 is pivotally attached to the frame attachment arm 22, the faces of the serrated discs 108 and 100 may be placed in meshing engagement at any one of many angular positions of the support arms 38 with respect to the frame attachment arm 22.

Figure 11:
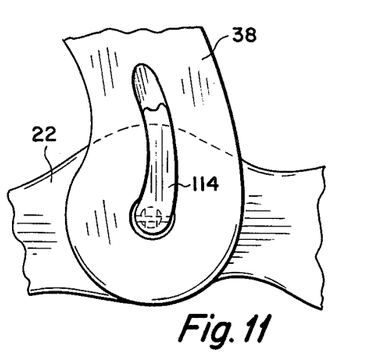
FIG. 11 is an elevational view of a first embodiment of a locking mechanism for the present invention.
Figure 12:
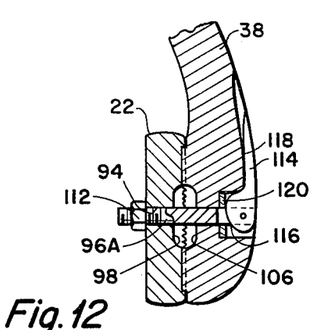
FIG. 12 is an end elevational sectional view of the locking mechanism of FIG. 11 taken along the broken lines 12—12 of FIG. 11.

Referring now to FIGS. 11 and 12, pivot pin 96A has an inside end threaded and provided with a threadedly disposed nut 112 thereon. The pin 96A is slidably disposed within the bores 94 and 104 of the frame attachment arm 22 and support arm 38. The opposite end of the pivot pin 96A is provided with a pivotally attached lever arm 114 having a cam surface 116 surrounding the pivotal attachment thereof. The lever arm 14 is movable in and out of a shaped recess 118 in the outer surface of the support arm 38. The shaped recess 118 is provided with a cam follower surface 120 therein. It can be seen by the shape of the cam surface 116 that when the lever arm 116 is extended outwardly, tension is released on the pivot pin 96A thereby allowing the support arm 38 to be pivotally adjusted with respect to the frame attachment arm 22.

When the desired orientation of the support arm 38 with respect to the frame attachment member 22 is achieved, the lever member 114 is pivoted into the recess 118. The cam surface 116 then is forced into contact with the cam follower surface 120 thereby applying tension to the pivot pin 96A. This forces the support arm 38 tightly against the frame attachment arm 22 and likewise forces the serrations 110 of the support arm into meshing engagement with the serrations 102 of the frame support member which locks the support arm into position with respect to the frame attachment arm. It can further be seen that the threaded nut member 112 of the pivot pin 96A may be utilized to adjust the desired tension of the pivot pin 96A.

Referring now to FIG. 13 reference character 96B depicts a second embodiment of a pivot pin for attaching the support arm 38 to the frame attachment arm 22. The inner end of the pivot pin 96B is threaded as is the bore 96A provided in the frame support arm 22. The outer end of the pivot pin 96B is provided with a manual rotational knob 122 which is rigidly secured thereto. In this embodiment when it is desired to change the angular orientation of the support arm 38 with respect to the frame attachment arm 22, the pivot pin 96B is loosened by means of the knob member 122 thereby allowing disengagement of the serrations 110 and 102. After the support arm 38 has been oriented to a desired position, the pivot pin 96 is threadedly tightened, thereby forcing meshing engagement of the serrations 110 and 102 which locks the support arm 38 from further rotation with respect to the frame attachment arm 22.

Referring now to FIG. 14, reference character 96C depicts a pivot pin which is rigidly secured to and made a part of a frame attachment member 22 for securing the support arm 38 thereto. The outer end portion of the pivot pin 96B is provided with threads 124. A knob 126 having a threaded bore therethrough is threadedly attached to the outer end of the pivot pin 96A. In this configuration when it is desirable to change the orientation of the support arm 38 with respect to the frame attachment arm 22, the threaded nut member 126 is loosened, thereby allowing the serrations 110 and 102 to disengage which permits orienting the support arm 38. After the support arm 38 has been oriented to the desired position, the nut member 126 is tightened, thereby forcing the serrations 108 of the support arm 38 into meshing engagement with the serrations 102 of the frame attachment arm 22, again locking the support arms with respect to the frame attachment arm.

It is again pointed out that the various attachment and locking mechanisms hereinbefore described in connection with the support arm 38 and frame attachment arm 22 likewise apply to the opposite support arm 40 and frame attachment arm 24.

Referring now to FIG. 15, reference character 128 depicts a pivot pin for pivotally securing the support arm 38 to the frame attachment arm 22. In this embodiment the opposing serrated discs are not utilized but instead the support arm 38 is provided with a plurality of outwardly facing gear or ratchet teeth 130 surrounding the pivot pin 128. A ratchet pawl member 132 is pivotally attached to the frame attachment arm 22 by means of a pivot pin 134. The opposite end of the ratchet pawl member 134 is provided with a plurality of ratchet engagement teeth 136 which are meshingly engageable with the ratchet teeth 130. A spring member 138 is operably connected between the ratchet pawl member 132 and the frame attachment arm 22 for urging the ratchet pawl teeth 136 into engagement with the ratchet teeth 130.

The engagement of the ratchet pawl teeth 136 with the ratchet teeth 130 is offset from a line extending between the pivot pins 128 and 134 in a way so that the support arm 38 may be rotated forwardly by a ratcheting action and whereby the arm 38 may not be rotated rearwardly against the cooperating ratchet teeth.

In order to move the support arm 38 rearwardly, the ratchet pawl member 132 may be manually rotated out of contact with the support arm 38 as shown by the phantom lines of FIG. 15. After the arm 38 has been rotated to a desired position, the ratchet pawl member 132 may be released back into engagement with the ratchet teeth 130 of the support arm 38.

It is again noted that an identical set of ratchet apparatus which was described in relation to FIG. 15 of the drawings in connection with the support arms 38 and frame attachment arm 22 are provided also for the connection of the support arm 40 to the frame attachment arm 22.

Figure 16:
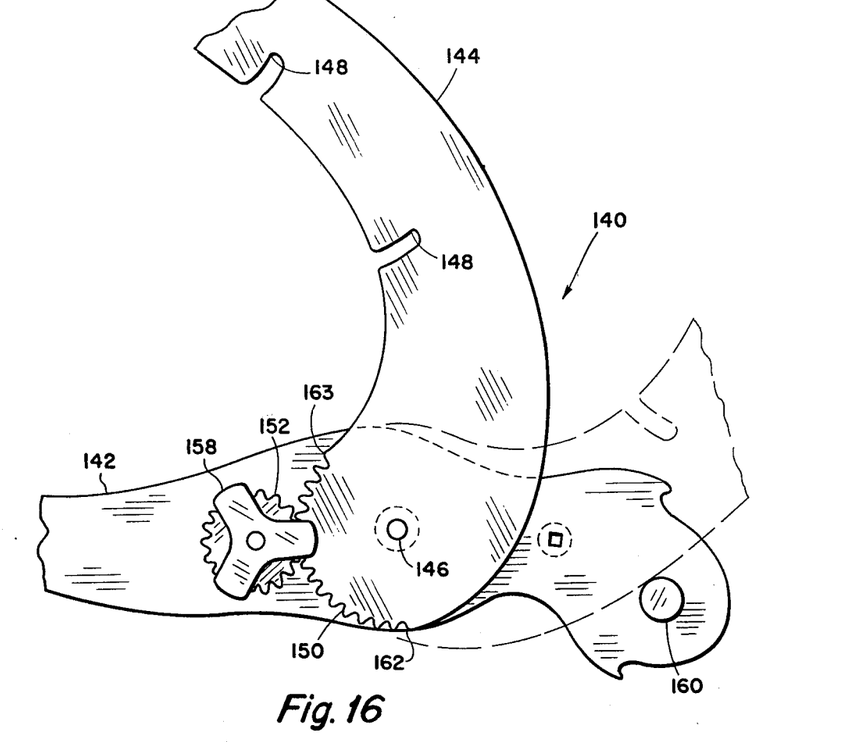
FIG. 16 is a side elevational view of a second embodiment of the backrest apparatus and a fifth embodiment of the locking device.
Figure 17:
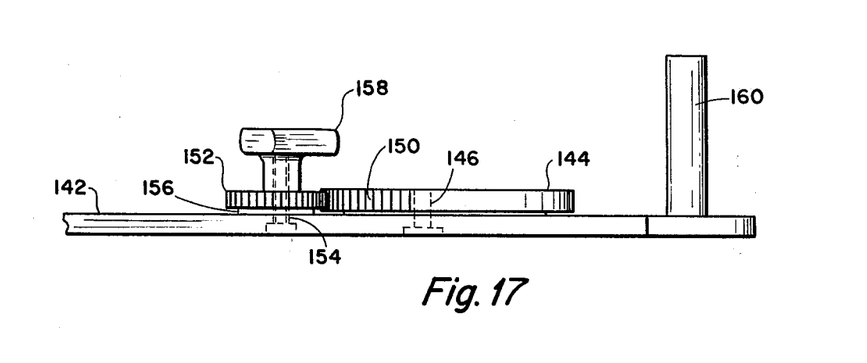
FIG. 17 is a bottom view of the apparatus of FIG. 16.

Referring to FIGS. 16 and 17, reference character 140 generally indicates a detail of a backrest embodying the present invention. It is noted that the detail shown in FIGS. 16 and 17 constitute only a portion of the left side of the backrest apparatus, it being understood that the opposite right side thereof will constitute parts constructed in a mirror image of those shown herein.

The device 140 comprises a horizontal frame arm member 142 which will attach to the frame 18 of the motorcycle in a manner similar to the frame arm 22. Pivotally supported to the frame arm 142 is a backrest support arm 144, the pivotal attachment constituting a pivot pin 146 which extends through both arms 142 and 144. The support arm 144 also comprises a plurality of spaced notches 148 for the purpose of attaching luggage or other articles to the backrest.

The inner end of the support arm 144 is provided with a plurality of gear teeth 150 which partially surround the pivot pin 146. A gear member 152 is rotationally attached to the frame arm 142 by means of a pivot pin 154, the teeth of the gear 152 being in meshing engagement with the gear teeth 150 of the support arm 144.

Spaced between the gear member 152 and the frame arm 142 is a friction pad, disc or washer, 156. The inner end of the pivot pin 154 is threaded to accept a manual tightening knob 158 for the purpose of tightening the gear member 152 against the frictional pad 156.

Again this embodiment is provided with an outwardly extending tail light mounting stud 160 which, in addition to permitting the turn signal lamp for the motorcycle to be attached thereto, serves as a safety feature of limiting the rearward travel of the support arm 144 with respect to the frame arm 142 as shown by the dashed lines in FIG. 16. It is also noted that the gear teeth 150 that partially surround the pivot pin 146 terminate at points 162 and 163. The support arm is designed so that the termination point 162 of the gear 150 engages the gear teeth 152 at the same time as the rear portion of the support arm 44 contacts the turn signal lamp stud member 160 thence providing a double safety feature to limit the travel of the arm member in a rearward direction. Travel in a forward direction is limited by the termination of gear teeth 163.

It is further noted at this point that the turn signal studs 30 and 32 hereinbefore described also serve as a safety feature in the same manner thereby limiting the rearward travel of the support arms 38 and 40.

The device of FIGS. 16 and 17 is operated by loosening the knob 158 and adjusting the support arm 144 to its desired position. The knob 158 is then tightened thereby locking gear member 152 in place which in turn locks the support arm 144 with respect thereto. It is also noted that the material for constructing the device of FIGS. 16 and 17 can be made from a flat plate steel as opposed to the contoured parts described in connection with the drawings of FIGS. 1 through 15.

Figure 18:
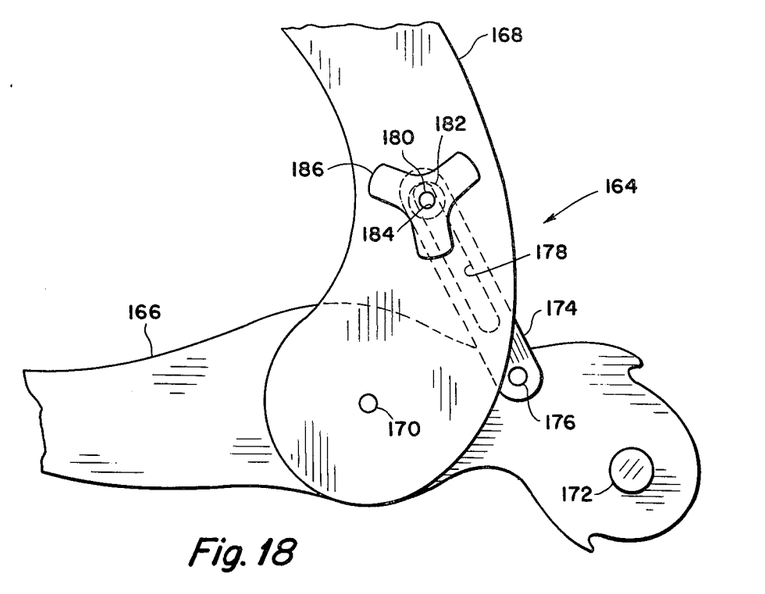
FIG. 18 is a side elevational view of a sixth embodiment of the locking device shown in the first position.
Figure 19:
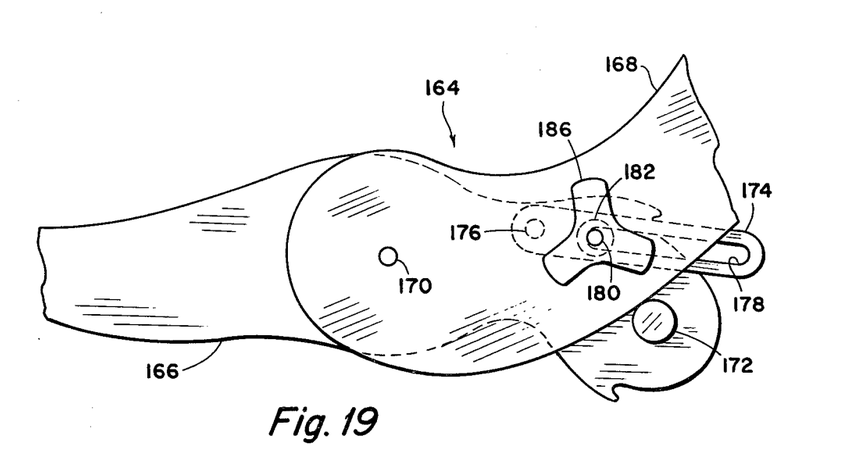
FIG. 19 is a side elevational view of the device of FIG. 18 shown in the second position.

Referring to FIGS. 18 and 19, reference character 164 generally indicates another embodiment of the locking device. The device 164 provides a frame arm member 166 and a pivotally attached support arm member 168. The support arm member 168 is attached to the frame arm 166 by means of a pivot pin 170. The rear end of the frame arm 166 is again provided with an outwardly extending turn signal lamp mounting stud 172.

The locking apparatus for this particular embodiment comprises an elongated brace member 174 which is pivotally attached at one end thereof by means of a pivot pin 176 to the frame arm 166. The brace member 174 further comprises an elongated closed longitudinal slot 178 therein.

A pin member 180 having a head portion 182 is rotatably carried by the support arm 168 through a bore 184. The head member 182 is larger than the width of the slot 178. The shank portion of the pin 180 is provided with suitable threads for securing a tightening knob 186 thereto. Also, the shank portion of the pin 180 is slidably carried in the slot 178.

In operation, when it is desired to change the angular orientation of the support arm 168 with respect to the frame arm 166, the knob 186 is loosened and the support is manually adjusted to the desired position. The knob 186 is then tightened thereby locking the support arm 168 with respect to the frame arm 166 by way of the brace arm 174.

Since the elongated slot 178 is closed, the outer end of that slot will limit the forward travel of the support arm 168. Likewise, the inner end of the slot 178 serves to limit the travel of the support arm 168 rearwardly as shown in FIG. 19. As an added safety feature when the inner limit of the slot is reached as shown in FIG. 19 the back of the support arm 168 comes into contact with the tail lamp mounting stud 172 thereby limiting any further travel of the support arm in a rearward direction.

From the foregoing, it is apparent that the present invention provides an adjustable backrest pad which may be positioned in a plurality of desired locations to support the back of a single motorcycle rider or passenger on the back of a motorcycle while providing locking apparatus for positively locking the position of the backrest with respect to the motorcycle frame.

Whereas, the present invention has been described in particular relation to the drawings attached hereto, other and further modifications as shown apart from those shown or suggested herein may be made within the spirit and scope of the invention.

What is claimed is:

1. A motorcycle backrest for mounting to the frame and working in cooperation with a two-place seat of a motorcycle, the backrest comprising a pair of oppositely disposed substantially horizontal frame arms, the forward end of said frame arms being securable to the motorcycle frame, rear bracket members for securing the rear ends of said frame arms to the motorcycle frame below the seat and on either side thereof;

a pair of oppositely disposed elongated support arms, a backrest pad member having a backrest surface and being directly secured to and disposed adjacent to first ends of the support arms; and means for pivotally securing opposite second ends of the support arms to the frame arms on either side of a rearmost portion of the two-place motorcycle seat, said means including means for selectively locking the support arms at a desired angular position ranging from substantially vertical for providing upper back support for a rearmost rider to a forward position for positioning said backrest member near the mid portion of the motorcycle seat to provide lower back support for a motorcycle driver alone;

wherein said backrest pad member is configured such that said backrest surface is presented in a same forwardly facing orientation relative to the back of the user regardless of the angular position of the support arms.

2. A motorcycle backrest as set forth in claim 1 wherein the means for pivotally securing the second ends of said support arms to the frame arms comprises a pair of axially aligned opposite facing pivot pins, one carried by each frame arm, a pivot pin bore being provided in the second end of each support arm for receiving the pivot pin therethrough.

3. A motorcycle backrest as set forth in claim 2 wherein the means for selectively locking the support arm comprises a plurality of ratchet type gear teeth surrounding the pivot pin bore of each support arm and a spring loaded ratchet pawl member carried by each frame arm and being yieldingly engageable with the gear teeth to permit ratcheting when the backrest pad is moved forwardly and to prevent movement of the pad member in a rearward direction, said ratchet pawl member being manually disengageable to permit adjustment of the pad rearwardly.

4. A motorcycle backrest as set forth in claim 3 wherein the means for selectively locking the support arms comprises, a first pair of oppositely facing annular discs, one surrounding each pivot pin and being rigidly supported by each frame arm, a plurality of spaced radially extending serrations being provided in the outer faces of each annular disc, a second pair of oppositely facing annular discs, one surrounding each pivot pin bore and rigidly supported by each support arm, a plurality of spaced radially extending serrations being provided on the outer faces of said second annular discs and being shaped to meshingly engage the serrations of the frame arms in a plurality of angular positions of the support arms, and including means carried by the pivot pin and cooperating with the support arms to selectively force the frame arm disc members in locking engagement with the support arm disc members.

5. A motorcycle backrest as set forth in claim 4 wherein the means for forcing the arms in locking engagement comprise threads provided on the outer ends of said pivot pins and a nut member being threadedly carried thereby and engageable with the support arm.

6. A motorcycle backrest as set forth in claim 4 wherein the means for forcing locking engagement comprise threads provided on the inner ends of the pivot pins, said pivot pins being threadedly carried by the frame arms, the outer ends of said pivot pins being provided with a rotatable handle member, said handle member being engageable with the support arm.

7. A motorcycle backrest as set forth in claim 4 wherein the outer ends of each pivot pin is provided with a pivotally mounted lever, one end of which has a cam surface, whereby when the lever is in a first position, the arm members are forced into locking engagement and when the lever is in the second position, the arms are loosened for angular adjustment and including a recess provided in each support arm for receiving the lever therein when in its first position for eliminating protrusion of said lever.

8. A motorcycle backrest as set forth in claim 7 wherein the inner ends of the pivot pins comprises means for adjusting the tension which is provided by the cam and cam follower surface.

9. A motorcycle backrest as set forth in claim 2 wherein the means for selectively locking the support arm comprises a plurality of gear teeth partially surrounding the pivot pin bore of each support arm, a gear member rotatably secured to each frame arm and being meshably engaged with said gear teeth of each support arm, and means for frictionally locking said gear members thereby locking said support arms in the desired position.

10. A motorcycle backrest as set forth in claim 9 wherein the gear teeth partially surrounding the pivot pin bore of each support arm terminate at a first end thereof in a position to limit the forward movement of the support arm and terminates at the opposite end thereof at a position to limit the rear positioning of the support arm.

11. A motorcycle backrest as set forth in claim 2 wherein the means for selectively locking the support arm comprises a first pair of pin members one carried by each frame arm and spaced from the pivot pin bore, a second pair of pin members one carried by each support arm and being spaced from the pivot pin bore, an elongated brace arm member, a first end of which is pivotally carried by each first pin member, the opposite end of each brace arm being provided with a longitudinal elongated aperture therein, said second pair of pin members being slidably disposed in each respective aperture of each brace member, and means carried by each support arm and operably connected to each second pin member for selectively locking said pin member and associated support arm within the aperture of each brace member.

12. A motorcycle backrest as set forth in claim 11 wherein each said elongated aperture is closed at an outer end thereof which serves to limit the forward travel of each support arm and is closed at an inner end thereof for limiting the rearward direction of each support arm.

13. A motorcycle backrest as set forth in claim 1 wherein said backrest pad member comprises a rigid plate member, an upholstered pad on a front surface thereof, said rigid plate member being pivotally secured to the first ends of the support arms above the center of gravity of said backrest pad member such that said pad member is substantially vertically disposed and forwardly facing regardless of the angular position of the support arms.

14. A motorcycle backrest as set forth in claim 1 wherein said backrest pad member comprises an elongated traverse rod secured between the first ends of the support arms, and a circular cylindrical shaped padded cushion surrounding the rod.

15. A motorcycle backrest for mounting to the frame and working in cooperation with a two-place seat of a motorcycle, the backrest comprising
a pair of oppositely disposed substantially horizontal frame arms, the forward end of said frame arms being securable to the motorcycle frame, rear bracket members for securing the rear ends of said frame arms to the motorcycle frame below the seat and on either side thereof;
a pair of oppositely disposed support arms, a backrest pad member having a backrest surface and being carried by first ends of the support arms; and
means for pivotally securing second ends of the support arms to the frame arms on either side of a rearmost portion of the two-place motorcycle seat, said means including means for selectively locking the support arms at a desired angular position ranging from substantially vertical for providing upper back support for a rearmost rider to a forward position for positioning said backrest member near the mid portion of the motorcycle seat to provide lower back support for a motorcycle driver alone;

wherein each frame arm includes a traversely extending stud member secured to the rear ends of the frame arms, each said stud member being engageable with each respective support arm when said support arm is pivoted past its substantially vertical angular position or rearmost position to positively limit rearward travel of the backrest pad member.

16. A motorcycle backrest for mounting to the frame and working in cooperation with a two-place seat of a motorcycle, the backrest comprising a pair of oppositely disposed substantially horizontal frame arms, the forward end of said frame arms being securable to the motorcycle frame, rear bracket members for securing the rear ends of said frame arms to the motorcycle frame below the seat and on either side thereof;

a pair of oppositely disposed support arms, a backrest pad member having a backrest surface and being carried by first ends of the support arms; and means for pivotally securing second ends of the support arms to the frame arms on either side of a rearmost portion of the two-place motorcycle seat, said means including means for selectively locking the support arms at a desired angular position ranging from substantially vertical for providing upper back support for a rearmost rider to a forward position for positioning said backrest member near the mid portion of the motorcycle seat to provide lower back support for a motorcycle driver alone;

wherein the rear bracket members comprise a pair of elongated plate members having a bore in one end and an elongated slot in the opposite end, a transverse off-set between the bore and the seat for providing some yieldability of the rear portion of the frame arms with respect to the motorcycle frame.

17. A motorcycle backrest as set forth in claim 16 wherein the transverse offset comprises said plate member being U-shaped, one leg thereof containing the bore and the other leg containing the slot.

* * * * *